(12) United States Patent
Tanaka et al.

(10) Patent No.: US 9,963,054 B2
(45) Date of Patent: May 8, 2018

(54) SIDE SUPPORT ADJUSTER

(71) Applicant: TOYOTA JIDOSHA KABUSHIKI KAISHA, Toyota-shi (JP)

(72) Inventors: Ken Tanaka, Toyota (JP); Akira Kaneko, Toyota (JP); Hiroshi Tamura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 48 days.

(21) Appl. No.: 15/104,122

(22) PCT Filed: Dec. 5, 2014

(86) PCT No.: PCT/IB2014/002660
§ 371 (c)(1),
(2) Date: Jun. 13, 2016

(87) PCT Pub. No.: WO2015/092505
PCT Pub. Date: Jun. 25, 2015

(65) Prior Publication Data
US 2016/0339814 A1    Nov. 24, 2016

(30) Foreign Application Priority Data

Dec. 16, 2013  (JP) ................................ 2013-259317

(51) Int. Cl.
*B60N 2/44*       (2006.01)
*B60N 2/22*       (2006.01)

(52) U.S. Cl.
CPC ......... *B60N 2/4492* (2015.04); *B60N 2/2222* (2013.01); *B60N 2/449* (2013.01); *B60N 2/4415* (2013.01)

(58) Field of Classification Search
CPC .... B60N 2/4492; B60N 2/449; B60N 2/4415; B60N 2/2222
(Continued)

(56) References Cited

U.S. PATENT DOCUMENTS 2,822,034 A * 2/1958 Dixon .................. B60N 2/449
                                                     297/230.13
6,257,664 B1 * 7/2001 Chew .................... A47C 7/405
                                                     297/284.9
(Continued)

FOREIGN PATENT DOCUMENTS

DE  10 2010 063 475 A1   6/2012
DE  10 2011 116 634 A1   4/2013
(Continued)

OTHER PUBLICATIONS

International Search Report and Written Opinion dated Mar. 5, 2015, in PCT/IB2015/002660 filed Dec. 5, 2014.

*Primary Examiner* — Milton Nelson, Jr.
(74) *Attorney, Agent, or Firm* — Oblon, McClelland, Maier & Neustadt, L.L.P.

(57) ABSTRACT

In an initial position, a movable plate (50) is rotatably connected to a fixed plate (40) by a connecting mechanism (70) (a shaft member (80) and a groove (72)). In a switching position, the movable plate (50) is slidably connected to the fixed plate (40) by the connecting mechanism (70) in a manner that enables the movable plate (50) to slide toward a seat width direction center side. When the movable plate (50) is pushed toward the seat width direction center side by the bladder (60), the movable plate (50) and a support pad are rotated from the initial position to the switching position. Then, the movable plate (50) that has rotated to the switching position is pushed toward the seat width direction center side, by the bladder (60), and the movable plate (50) and the sup port pad slide from the switching position toward the seat width direction center side.

5 Claims, 7 Drawing Sheets

(58) Field of Classification Search
USPC .................................................... 297/284.9
See application file for complete search history.

(56) References Cited

U.S. PATENT DOCUMENTS

| | | | | |
|---|---|---|---|---|
| 6,460,933 B1 * | 10/2002 | Bors | .................... | A61G 5/1067 |
| | | | | 297/284.9 |
| 7,490,899 B2 * | 2/2009 | McMillen | .............. | B60N 2/449 |
| | | | | 297/284.1 |
| 2009/0026821 A1 | 1/2009 | Macht et al. | | |
| 2010/0117412 A1 | 5/2010 | Bicker | | |

FOREIGN PATENT DOCUMENTS

| | | |
|---|---|---|
| JP | 6-296530 A | 10/1994 |
| JP | 2010-279488 A | 12/2010 |
| JP | 2015-74245 A | 4/2015 |

\* cited by examiner

SIDE SUPPORT ADJUSTER

BACKGROUND OF THE INVENTION

1. Field of the Invention

The invention relates to a side support adjuster used in a seatback.

2. Description of Related Art

In a vehicle seat apparatus described in Japanese Patent Application Publication No. 2010-279488 (JP 2010-279488 A), a support pad is provided on a seat front side of a support bracket (a fixed plate). Also, a bag body (an actuator) is provided between the support bracket and the support pad. The support pad is pushed up toward the seat front side by the bag body inflating. As a result, the support pad is able to match the width of the body of an occupant that has a relatively small build.

However, with the vehicle seat apparatus described above, even though the support pad is pushed up toward the seat front side, the support pad is not adjusted in the seat width direction. Therefore, there is room for improvement in terms of adjusting the support pad according to the build of the occupant.

SUMMARY OF THE INVENTION

The invention thus provides a side support adjuster capable of adjusting a side support in a seat width direction.

A first aspect of the invention relates to a side support adjuster that includes i) a fixed plate that is provided on a back surface side of a support pad that forms a side support on both sides of a seatback in a seat width direction, and that is fixed to a frame member of the seatback; ii) a movable plate that is provided between the fixed plate and the support pad, and supports the support pad from the back surface side, and that is relatively movably connected to the fixed plate; iii) an actuator that is provided between the fixed plate and the movable plate, and that pushes the movable plate toward a seat width direction center side in response to being activated; and iv) a connecting mechanism that rotatably connects a seat width direction inside end portion of the movable plate to the fixed plate, in an initial position, and slidably connects the end portion to the fixed plate in a manner that enables the end portion to slide toward the seat width direction center side, in a switching position in which the movable plate has rotated by a predetermined angle toward the seat width direction center side.

With this side support adjuster, the fixed plate is provided on the back surface side of the support pad that forms the side support of the seatback, and the fixed plate is fixed to a frame member of the seatback. Also, the movable plate is provided between the fixed plate and the support pad. This movable plate is relatively movably connected to the fixed plate, and supports the support pad from the back surface side. As a result, when the movable plate moves relative to the fixed plate, the movable plate and the support pad both move relative to the fixed plate.

Also, the actuator is provided between the fixed plate and the movable plate, and the movable plate is pushed toward the seat width direction center side by the actuator in response to the actuator being activated.

Here, in the initial position, the seat width direction inside end portion of the movable plate is rotatably connected to the fixed plate by the connecting mechanism. Also, in the switching position in which the movable plate has rotated by a predetermined angle toward the seat width direction center side, the end of the movable plate is slidably connected to the fixed plate in a manner that enables the end of the movable plate to slide toward the seat width direction center side.

Therefore, when the movable plate is pushed toward the seat width direction center side by the actuator, the movable plate rotates from the initial position to the switching position. Consequently, the support pad rotates toward the seat width direction center side as the movable plate rotates. Also, the movable plate that has rotated to the switching position is pushed toward the seat width direction center side by the actuator, and the movable plate slides from the switching position toward the seat width direction center side. As a result, the support pad slides toward the seat width direction center side as the movable plate slides.

In this way, with this side support adjuster, the support pad slides toward the seat width direction center side after being rotated toward the seat width direction center side. As a result, the side support is able to be adjusted in the seat width direction.

The connecting mechanism may include a shaft portion that is provided on one of the movable plate and the fixed plate, and of which an axial direction is in a seat height direction, and a groove provided in the other of the movable plate and the fixed plate. Also, an outer peripheral surface of the shaft portion may include an arced surface portion that is curved so as to have an arc-shaped cross-section, and a flat portion that connects both ends of the arced surface portion together. Further, the groove may have a slide groove that is formed in a straight line, a width of the slide groove being set larger than a diameter of the flat surface portion of the shaft portion and smaller than a diameter of the arced surface portion of the shaft portion, and a first supporting hole that is formed in one end portion of the slide groove in a length direction thereof, and into which the shaft portion in the initial position is rotatably inserted.

As described above, the connecting mechanism includes a shaft portion, the axial direction of which is in the seat height direction, and a groove into which the shaft portion is inserted. This shaft portion is provided in one of the movable plate and the fixed plate, and the outer peripheral surface of the shaft portion includes an arced surface portion that is curved so as to have an arc-shaped cross-section, and a flat portion that connects both ends of the arced surface portion together. That is, the cross-section of the shaft portion is formed having a so-called D-cut shape.

Meanwhile, the groove is provided in the other of the movable plate and the fixed plate. This groove includes the slide groove that is formed in a straight line, and the first supporting hole that is formed in one end portion of the slide groove in the length direction thereof.

Also, in the initial position, the shaft portion is rotatably inserted in the first supporting hole. Also, the width of the slide groove is set larger than the diameter of the flat surface portion of the shaft portion and smaller than the diameter of the arced surface portion of the shaft portion. Therefore, by setting the position of the flat surface portion of the shaft portion with respect to the slide groove such that the flat surface portion of the shaft portion is parallel to the slide groove in the switching position, the shaft portion is able to slide in (move parallel to) the slide groove. As a result, the side support is able to be adjusted in the seat width direction via a simple structure.

The groove may have a second supporting hole configured to be able to rotatably support the shaft portion, at the other end portion of the slide groove in the length direction thereof.

That is, the groove may have a second supporting hole, and the second supporting hole may be formed at the other end portion of the slide groove in the length direction thereof, and be configured to be able to rotatably support the shaft portion. Therefore, the movable plate (i.e., the support pad) that has been slid (moved parallel) from the switching position toward the seat width direction center side is able to be rotated even further toward the seat width direction center side at the other end portion of the slide groove in the length direction thereof. As a result, the side support is able to be adjusted even more in the seat width direction with respect to an occupant with a relatively small build.

A second aspect of the invention relates to a side support adjuster that includes i) a fixed plate that is provided on a back surface side of a support pad that forms a side support on both sides of a seatback in a seat width direction, and that is fixed to a frame member of the seatback; ii) a movable plate that is provided between the fixed plate and the support pad, and supports the support pad from the back surface side, and that is relatively movably connected to the fixed plate; iii) an actuator that is provided between the fixed plate and the movable plate, and that pushes the movable plate toward a seat width direction center side in response to being activated; and iv) a connecting mechanism that slidably connects a seat width direction inside end portion of the movable plate to the fixed plate in a manner that enables the end portion to slide toward the seat width direction center side, in an initial position, and rotatably connects the end portion to, the fixed plate, in a switching position in which the movable plate has slid a predetermined distance toward the seat width direction center side.

In this side support adjuster, in the initial position, the seat width direction inside end portion of the movable plate is slidably connected to the fixed plate by the connecting mechanism in a manner that enables the end portion to slide toward the seat width direction center side. Also, in the switching position in which the movable plate has slid a predetermined distance toward the seat width direction center side, the end portion of the movable plate is rotatably connected to the fixed plate.

Therefore, when the movable plate is pushed toward the seat width direction center side by the actuator, the movable plate slides from the initial position to the switching position. Consequently, support pad slides toward the seat width direction center side as the movable plate slides. Then, the movable plate that has slid to the switching position is pushed toward the seat width direction center side by the actuator, and the movable plate rotates from the initial position toward the seat width direction center side. As a result, the support pad rotates toward the seat width direction center side as the movable plate rotates.

In this way, after the support pad has slid toward the seat width direction center side, the support pad is rotated toward the seat width direction center side. Thus, the side support is able to be adjusted in the seat width direction.

The connecting mechanism may include a shaft portion that is provided on one of the movable plate and the fixed plate, and of which an axial direction is in a seat height direction, and a groove provided in the other of the movable plate and the fixed plate. Also, the groove may have a slide groove that is formed in a straight line and into which the shaft portion in the initial position is rotatably inserted, at one end in a length direction, and a supporting hole that is formed in an end portion of the slide groove in the length direction thereof, and that is configured to be able to rotatably support the shaft portion. An outer peripheral surface of the shaft portion may include an arced surface portion that is curved so as to have an arc-shaped cross-section, and a flat portion that connects both ends of the arced surface portion together. Further, a width of the slide groove may be set larger than a diameter of the flat surface portion of the shaft portion and smaller than a diameter of the arced surface portion of the shaft portion.

As described above, the connecting mechanism includes the shaft portion, the axial direction of which is in the seat height direction, and the groove into which the shaft portion is inserted. This shaft portion is provided in one of the movable plate and the fixed plate, and the outer peripheral surface of the shaft portion includes an arced surface portion that is curved so as to have an arc-shaped cross-section, and a flat portion that connects both ends of the arced surface portion together. That is, the cross-section of the shaft portion is formed having a so-called D-cut shape.

Meanwhile, the groove is provided in the other of the movable plate and the fixed plate. This groove includes a slide groove that is formed in a straight line, and the width of this slide groove is set to be larger than the diameter of the flat surface portion of the shaft portion and smaller than the diameter of the arced surface portion of the shaft portion. Also, in the initial position, the shaft portion is slidably inserted into one end portion of the slide groove in the length direction thereof. That is, in the initial position, the flat surface portion of the shaft portion is arranged parallel to the slide groove.

The groove also has a supporting hole. This supporting hole is formed in the other end portion of the slide groove in the length direction thereof, and is configured to be able to rotatably support the shaft portion. As a result, the movable plate (i.e., the support pad) that has slid from the initial position to the switching position (i.e., the supporting hole) is able to rotate in the switching position (i.e., the supporting hole). Hence, the side support is able to be adjusted in the seat width direction via a simple structure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Example Embodiment

Figure 1:
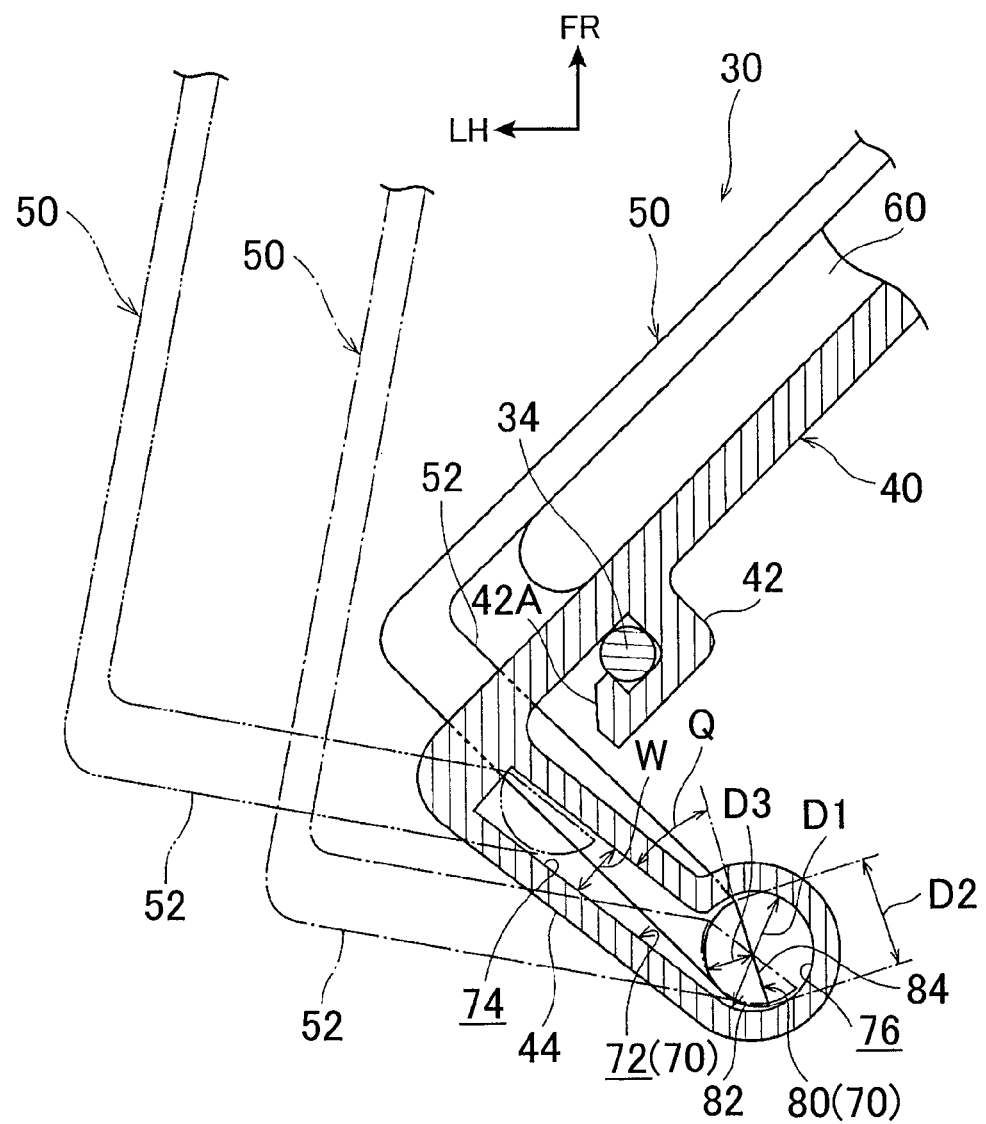
FIG. 1 is a top sectional view showing a frame format of a connecting mechanism of a side support adjuster according to a first example embodiment of the invention.

A vehicle seat 10 to which a side support adjuster 30 according to a first example embodiment of the invention has been applied will now be described with reference to the accompanying drawings. In the drawings, arrow FR indicates a forward direction with respect to the seat, arrow UP indicates an upward direction with respect to the seat, and arrow LH indicates a direction to the left of the seat (one side in the seat width direction). Also, the forward direction with respect to the seat, the upward direction with respect to the seat, and the direction to the left of the seat match a forward direction, an upward direction, and a direction to the left, respectively, of the vehicle within which the vehicle seat 10 is mounted.

Figure 4:
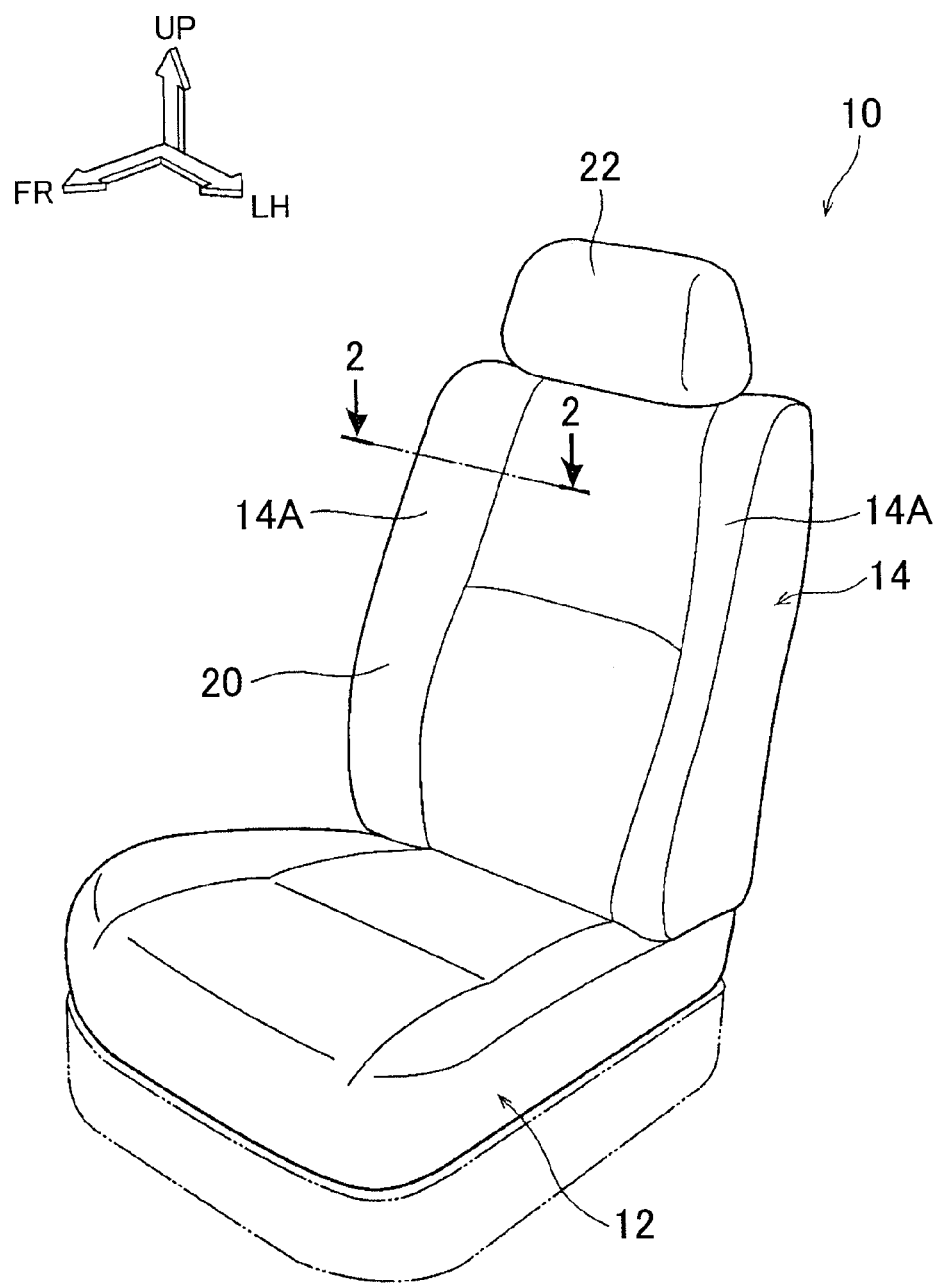
FIG. 4 is a perspective view of the entire vehicle seat to which the side support adjuster shown in FIG. 2 has been applied, from an angle to the left in front of the seat.

As shown in FIG. 4, a vehicle seat 10 is a front seat, mounted in a front portion inside a cabin of a vehicle (automobile). The vehicle seat 10 includes a seat cushion 12 that supports the buttocks of a seated occupant. A seatback 14 that supports a back of the seated occupant is provided in an upright position on a rear end portion of this seat cushion 12. A lower end portion of the seatback 14 is tiltably connected to the rear end portion of the seat cushion 12. Also, a headrest 22 that supports the head of the seated occupant is provided on a seat upper side of the seatback 14. The headrest 22 is supported by the seatback 14.

Figure 2:
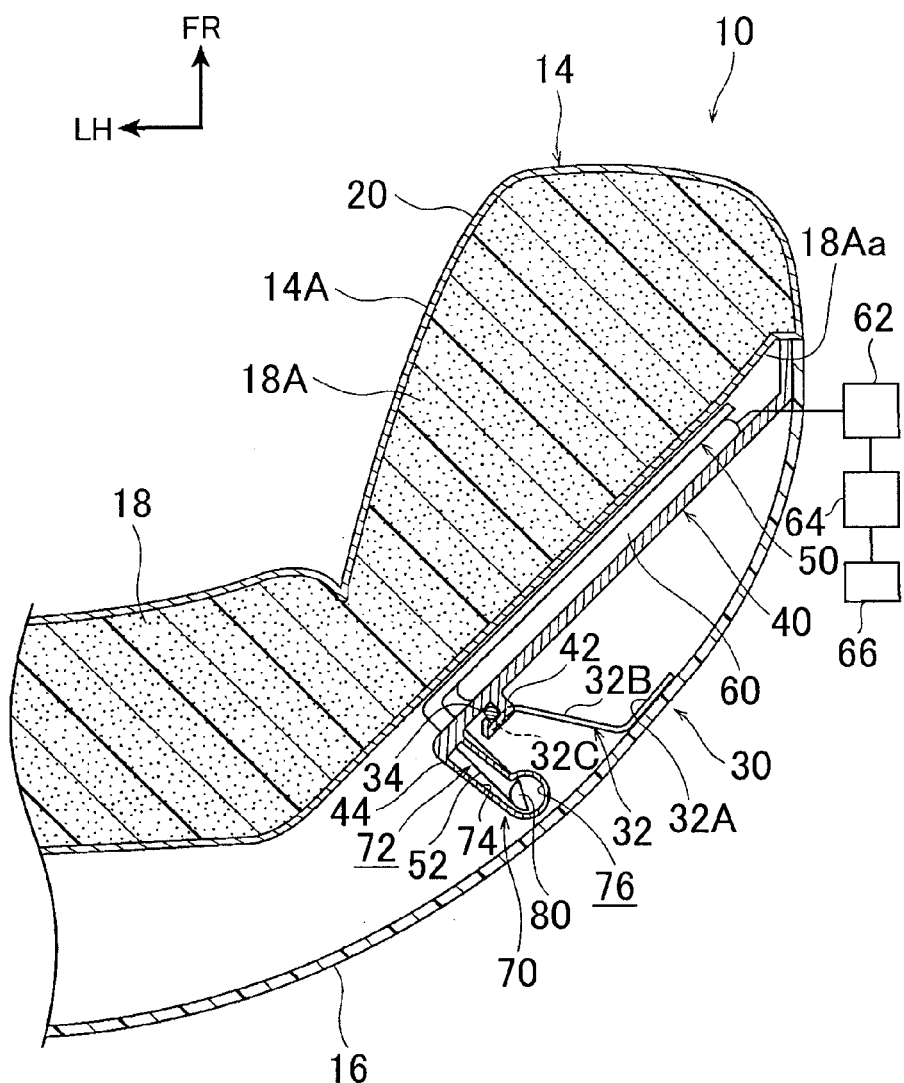
FIG. 2 is a top sectional view (a sectional view taken along line 2-2 in FIG. 4) showing a frame format of a seat right side portion of a seatback to which the side support adjuster according to the first example embodiment has been applied.

Next, both seat width direction side portions of the seatback 14 will be described. Both seat width direction side portions of the seatback 14 are laterally symmetrical, so only the seat right side portion of the seatback 14 will be described. A description of the seat left side portion of the seatback 14 will be omitted. As shown in FIG. 2, both seat width direction side portions of the seatback 14 are side supports 14A. Each side support 14A protrudes toward the seat front side with respect to a seat width direction center portion of the seatback 14. Also, a back surface portion of the seatback 14 is formed by a seatback frame 16 that forms a frame member of the seatback 14. This seatback frame 16 is made of carbon fiber reinforced plastic (CFRP), and is formed in a so-called shell shape that opens toward the seat front side.

Further, a seatback pad 18 that is made of foam material such as urethane is provided inside the seatback 14. Both seat width direction side portions of this seatback pad 18 are support pads 18A that form the side supports 14A. A back surface 18Aa of each support pad 18A is slanted outward in the seat width direction toward the seat front side when viewed from above, and is supported by a movable plate 50 of a side support adjuster 30 that will be described later. The seatback pad 18 is covered by a cover 20.

Next, the side support adjuster 30 will be described. The side support adjuster 30 includes a bracket 32, a fixed plate 40, the movable plate 50, a bladder 60 that serves as an actuator, and a connecting mechanism 70.

The bracket 32 is made of steel sheet or the like, and is arranged on the back surface 18Aa side (seat rear side) of the support pad 18A, and is formed so as to be generally crank-shaped when in a plan view when viewed from the seat upper side. More specifically, the bracket 32 includes a rear wall 32A arranged along a front surface of the seatback frame 16, a slanted wall 32B that extends inward in the seat width direction from a seat width direction inside end of the rear wall 32A toward the seat front side, and a front wall 32C that extends inward in the seat width direction from a front end of the slanted wall 32B toward the seat rear side. Also, the rear wall 32A of the bracket 32 is fixed to the seatback frame 16. Also, a generally round bar-shaped wire 34 is provided on a front surface of the front wall 32C, and this wire 34 is fixed to the front wall 32C with a length direction of the wire 34 being the seat height direction.

The fixed plate 40 is arranged between the bracket 32 and the support pad 18A, and is arranged facing the back surface 18Aa of the slanted outer peripheral surface 18a. That is, the fixed plate 40 is slanted outward in the seat width direction toward the seat front side when viewed from above. Also, a seat width direction outside end portion of the fixed plate 40 is bent toward generally the seat front side and fixed to the seatback frame 16. Meanwhile, an engaging piece 42 having a generally L-shaped cross-section is integrally formed on a seat width direction inside portion of the fixed plate 40, as shown in FIG. 1. This engaging piece 42 extends from the fixed plate 40 toward the seat rear side so as to be orthogonal to the fixed plate 40, and a portion on a tip end side of the engaging piece 42 is bent inward in the seat width direction so as to be parallel to the fixed plate 40. Also, a hook portion 42A that has a generally trapezoidal-shaped cross-section is integrally formed on the tip end portion of the engaging piece 42. The hook portion 42A protrudes toward the fixed plate 40 side. The wire 34 is arranged between the engaging piece 42 and the fixed plate 40, and the hook portion 42A is engaged, with the wire 34. As a result, the fixed plate 40 is fixed to the seatback frame 16 via the bracket 32.

Also, a fixed-side connecting portion 44 is integrally formed on a seat width direction inside end portion of the fixed plate 40, in a position farther to the inside than the engaging piece 42 in the seat width direction. This fixed-side connecting portion 44 extends from the seat width direction inside end of the fixed plate 40 toward the seat rear side, in a manner substantially orthogonal to the fixed plate 40. That is, the fixed-side connecting portion 44 is slanted outward in the seat width direction toward the seat rear side when viewed from above.

As shown in FIG. 2, the movable plate 50 is arranged facing the back surface 18Aa of the support pad 18A, between the fixed plate 40 and the support pad 18A. That is, the movable plate 50 is slanted outward in the seat width direction toward the seat front side when viewed from above. This movable plate 50 is movably connected to the fixed plate 40 by the connecting mechanism 70, which will be described later, in such a manner that enables the movable plate 50 to move toward the seat width direction center side (i.e., the center of the seat in the seat width direction, and hereinafter referred to as such) relative to the fixed plate 40. Also, the movable plate 50 supports the support pad 18A from the back surface 18Aa side, so when the movable plate 50 moves relative to the fixed plate 40, the support pad 18A moves together with the movable plate 50, relative to the fixed plate 40.

Further, a movable-side connecting portion 52 is integrally formed with the movable plate 50, on a seat width direction inside end portion of the movable plate 50. The movable-side connecting portion 52 extends from the seat width direction inside end portion of the movable plate 50 toward the seat rear side, in a manner substantially orthogonal to the movable plate 50. That is, the movable-side connecting portion 52 is slanted outward in the seat width direction toward the seat rear side when viewed from above.

The bladder 60 is formed in a bag shape, and is arranged between the fixed plate 40 and the movable plate 50. Also, an air pump 62 is connected to the bladder 60 via an air tube, not shown. This air pump 62 is electrically connected to an ECU 64 of the vehicle, and an operating button 66 is also electrically connected to the ECU 64. When a seated occupant operates the operating button 66, air is consequently supplied from the air pump 62 into the bladder 60 by control of the ECU 64. As a result, the bladder 60 inflates and pushes the movable plate 50 toward the center of the seat in the seat width direction.

As shown in FIG. 1, the connecting mechanism 70 is a mechanism for connecting the movable plate 50 to the fixed plate 40, and includes a groove 72 and a shaft portion 80. The groove 72 is formed through the fixed-side connecting portion 44 of the fixed plate 40, and extends in the extending direction of the fixed-side connecting portion 44 when viewed from above. More specifically, the groove 72 has a slide groove 74 formed in a straight line, and the slide groove 74 is slanted inward in the seat width direction (i.e., toward the center of the seat in the seat width direction) toward the seat front side when viewed from above. The groove 72 also has a circular first supporting hole 76 formed in a rear end portion (one end portion in the length direction) of the slide groove 74. This first supporting hole 76 is communicated with the slide groove 74. Also, the diameter D1 of the first supporting hole 76 is set larger than a width W of the slide groove 74.

The shaft portion 80 is integrally formed on a rear end portion of the movable-side connecting portion 52 of the movable plate 50. Also, the shaft portion 80 is formed in a generally semicylindrical shape and is arranged with the axial direction thereof being in the seat height direction. Therefore, an outer peripheral surface of the shaft portion 80 includes an arced surface portion 82 that is curved so as to have an arc-shaped cross-section, and a planar-shaped flat portion 84 that connects both ends of the arced surface portion 82. That is, the sectional shape of the shaft portion 80 is formed in a so-called D-cut shape. Also, the diameter of the arced surface portion 82 of the shaft portion 80 is designated D2, and the diameter of the flat portion 84 of the shaft portion 80 (i.e., the distance between the flat portion 84 and the apex of the arced surface portion 82, on a line perpendicular to the flat portion 84) is designated D3. Also, the diameter D1 of the first supporting hole 76 of the groove 72 is set slightly larger than the diameter D2 of the arced surface portion 82 of the shaft portion 80.

Moreover, when the bladder 60 is in a non-activated state before being activated (i.e., the state indicated by the solid line in FIG. 1 and shown in FIG. 2; the position of the movable plate 50 (support pad 18A) in this state will be referred to as the "initial position"), the shaft portion 80 is rotatably supported in the first supporting hole 76 of the groove 72. An angle between the flat portion 84 and the slide groove 74 in the initial position is a predetermined angle θ.

Figure 3A:
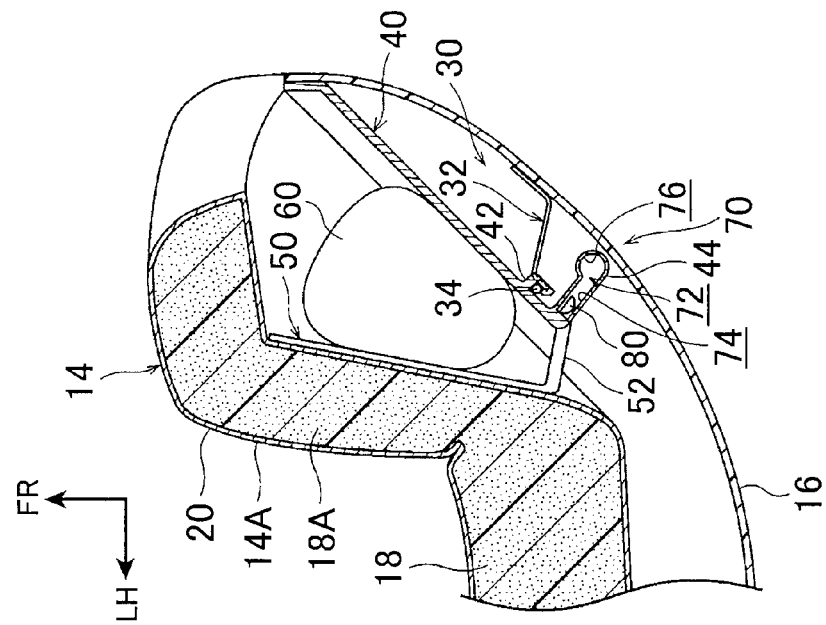
FIG. 3A is a top sectional view showing a frame format of a support pad shown in FIG. 2 in a state rotated to a switching position.

Also, the width W of the slide groove 74 is set slightly larger than the diameter D3 of the flat portion 84 of the shaft portion 80, and smaller than the diameter D2 of the arced surface portion 82 of the shaft portion 80. Also, when the shaft portion 80 (the movable plate 50) is rotated by the predetermined angle θ from the initial position toward the center in the vehicle width direction, the flat portion 84 and the slide groove 74 become parallel (in the position indicated by the dashed line in FIG. 1 and shown in FIG. 3; this position will hereinafter be referred to as the "switching position"). As a result, the width W of the slide groove 74 is set larger than the diameter D3 of the flat portion 84 of the shaft portion 80, so when the shaft portion 80 is rotated to the switching position, the shaft portion 80 is able to slide (move parallel) along the slide groove 74 from the initial position toward the seat front side and center of the seat in the seat width direction.

Accordingly, in the first example embodiment, the movable plate 50 (i.e., the movable-side connecting portion 52 of the movable plate 50) is rotatably connected to the fixed plate 40 (i.e., the fixed-side connecting portion 44 of the fixed plate 40) by the connecting mechanism 70 (i.e., the shaft portion 80 and the groove 72), in the initial position. Also, in the switching position in which the movable plate 50 has been rotated by the predetermined angle θ toward the center of the seat in the seat width direction when viewed from above, the movable plate 50 is connected by the connecting mechanism 70 (i.e., the shaft portion 80 and the groove 72) to the fixed plate 40 so as to be able to slide toward the center of the seat in the seat width direction. When the movable plate 50 slides (i.e., moves parallel) along the slide groove 74, the movable plate 50 slides toward the seat front side and center of the seat in the seat width direction, to be exact. Therefore, "connected so as to be able to slide toward the center of the seat in the seat width direction" also includes a case in which the movable plate 50 is connected to the fixed plate 40 in a manner so as to be able to slide toward the seat front side and center of the seat in the seat width direction.

Next, the operation and effect of this example embodiment will be described.

With the vehicle seat 10 provided with the side support adjuster 30 structured as described above, the state illustrated in FIG. 2 is a non-activated state of the side support adjuster 30, and in this state, the movable plate 50 is arranged in the initial position (see FIG. 2). When the seated occupant operates the operating button 66 in order to activate the side support adjuster 30, the air pump 62 is activated by control of the ECU 64, and air is supplied into the bladder 60. As a result, the bladder 60 inflates and the movable plate 50 is pushed toward the center of the seat in the seat width direction by the bladder 60.

Here, in the initial position, the seat width direction inside end portion (i.e., the movable-side connecting portion 52) of the movable plate 50 is rotatably connected to the fixed plate 40 by the connecting mechanism 70 (i.e., the shaft portion 80 and the groove 72). In the switching position in which the movable plate 50 has been rotated by the predetermined angle θ toward the inside in the seat width direction (toward the center of the seat in the seat width direction), the movable plate 50 is connected to the fixed plate 40 by the connecting mechanism 70 (i.e., the shaft portion 80 and the groove 72) so as to be able to slide toward the center of the seat in the seat width direction.

Figure 3B:
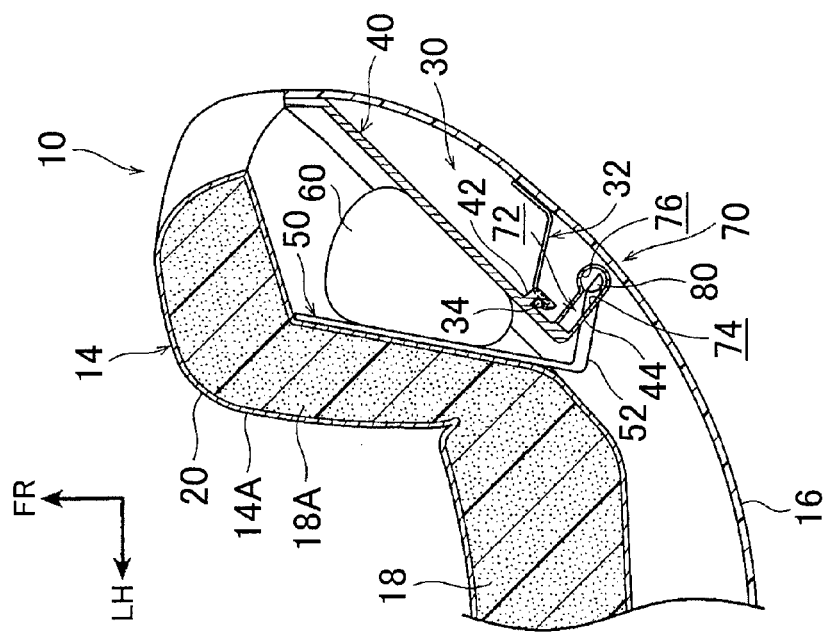
FIG. 3B is a top sectional view showing a frame format of the support pad in a state moved from the switching position shown in FIG. 3A toward the seat width direction center side.

Therefore, when the movable plate 50 is pushed toward the center of the seat in the seat width direction by the bladder 60, the movable plate 50 rotates from the initial position to the switching position. As a result, the support pad 18A (i.e., the side support 14A) rotates toward the center of the seat in the seat width direction as the movable plate 50 rotates (see FIG. 3A). Also, the movable plate 50 that has rotated to the switching position is pushed toward the center of the seat in the seat width direction by the bladder 60, so the movable plate 50 slides from the switching position toward the center of the seat in the seat width direction. As a result, the support pad 18A (i.e., the side support 14A)

slides toward the center of the seat in the seat width direction as the movable plate 50 slides (see FIG. 3B).

In this way, with the side support adjuster 30 of the first example embodiment, the side support 14A (i.e., the support pad 18A) slides toward the center of the seat in the vehicle width direction after being rotated toward the center of the seat in the seat width direction. Therefore, the seatback 14 (i.e., the support pad 18A) is able to be adjusted in the seat width direction according to the build of the occupant.

Also, the shaft portion 80 of the connecting mechanism 70 is provided on the movable-side connecting portion 52 of the movable plate 50, and the outer peripheral surface of the shaft portion 80 includes the arced surface portion 82 and the flat portion 84. Meanwhile, the groove 72 of the connecting mechanism 70 is provided in the fixed-side connecting portion 44 of the fixed plate 40, and includes the slide groove 74 that is formed in a straight line, and the first supporting hole 76 that is formed in a rear end portion (one end portion in the length direction) of the slide groove 74.

Also, in the initial position, the shaft portion 80 is rotatably inserted into the first supporting hole 76, and that angle formed between the flat portion 84 of the shaft portion 80 and the slide groove 74 is made the predetermined angle θ. Also, the width W of the slide groove 74 is set larger than the diameter D3 of the flat portion 84 of the shaft portion 80, and smaller than the diameter D2 of the arced surface portion 82 of the shaft portion 80.

As a result, when the movable plate 50 rotates from the initial position to the switching position, the flat portion 84 of the shaft portion 80 is arranged parallel to the slide groove 74, such that the shaft portion 80 is able to slide in (move parallel to) the slide groove 74. Therefore, the side support 14A is able to be adjusted in the seat width direction according to the build of the occupant via a simple structure.

Moreover, with the side support adjuster 30 of the first example embodiment, the seatback 14 (i.e., the support pad 18A) slides toward the center of the seat in the seat width direction after being rotated toward the center of the seat in the seat width direction. Therefore, with an occupant that has a relatively large build, a side portion of the upper body of the occupant is able to be supported by the side support 14A (i.e., the support pad 18A) that is arranged in the switching position, for example. That is, the seatback 14 (i.e., the support pad 18A) is able to be arranged in the switching position by the seated occupant stopping operation of the operating button 66, when the side support 14A (i.e., the support pad 18A) has been rotated from the initial position to the switching position, for example. As a result, with an occupant that has a relatively large build, a side portion of the upper body of the occupant is able to be supported by the side support 14A (i.e., the support pad 18A) that is arranged in the switching position, when the side support 14A does not need to be slid from the switching position toward the center of the seat in the seat width direction.

Figure 5:
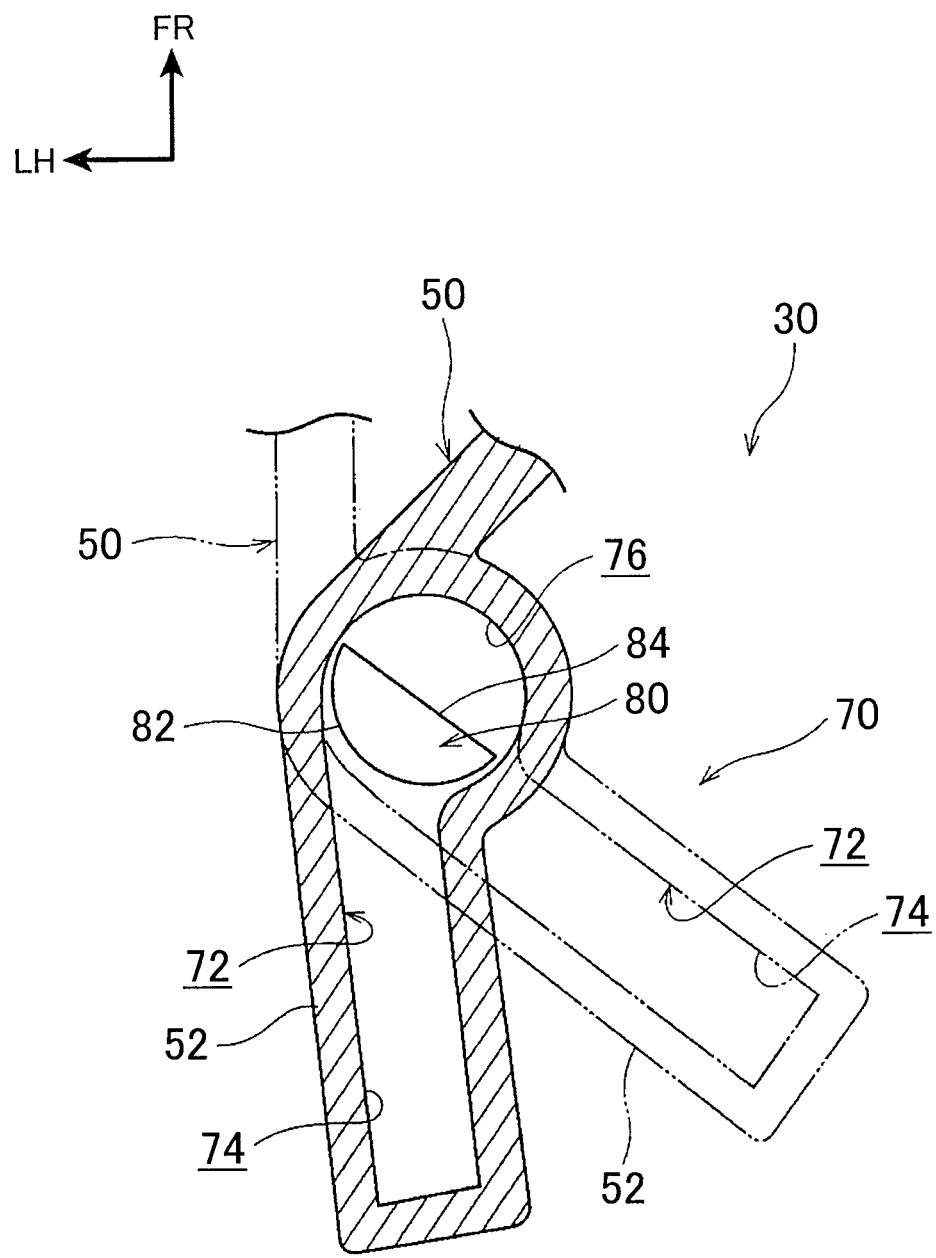
FIG. 5 is a top sectional view showing a frame format of one example of a modified example of the connecting mechanism shown in FIG. 1.

In the first example embodiment, the groove 72 is provided in the fixed plate 40, and the shaft portion 80 is provided on the movable plate 50. Instead of this, the groove 72 may be provided in the movable-side connecting portion 52 of the movable plate 50, as shown in FIG. 5, and the shaft portion 80 may be provided on the fixed plate 40 (not shown).

In this case, the movable-side connecting portion 52 is formed extending from the seat width direction inside end portion of the movable plate 50 toward the vehicle rear side. The slide groove 74 of the groove 72 is formed following the movable-side connecting portion 52, and the first supporting hole 76 is formed in a front end portion (one end portion in the length direction) of the slide groove 74. Further, the shaft portion 80 is rotatably inserted in the first supporting hole 76.

Figure 6:
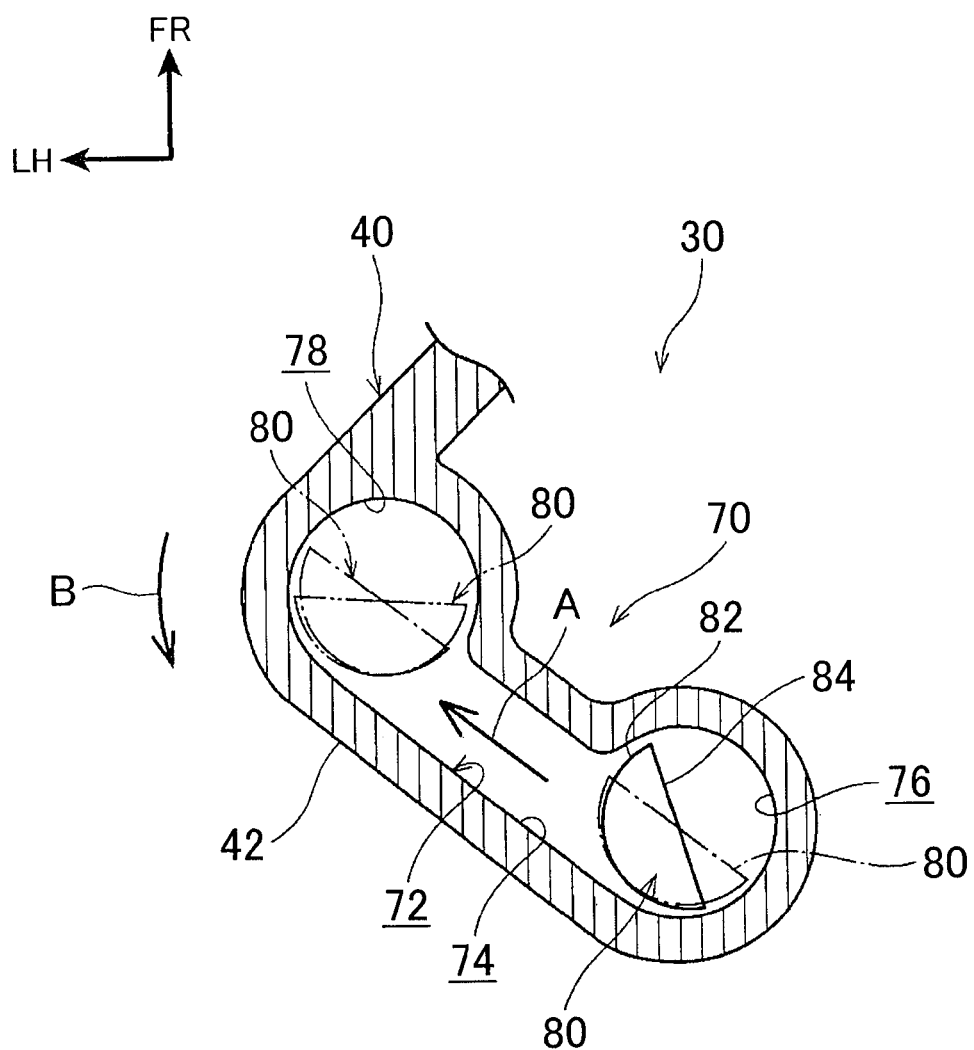
FIG. 6 is a top sectional view showing a frame format of another example of a modified example of the connecting mechanism shown in FIG. 1.

Also, in the first example embodiment, the first supporting hole 76 is formed in the rear end portion (one end portion in the length direction) of the slide groove 74, but in addition, a second supporting hole 78 configured to be able to rotatably support the shaft portion 80 may also be formed in the front end portion (the other end portion in the length direction) of the slide groove 74, as shown in FIG. 6. That is, the diameter of the second supporting hole 78 may be set the same as the diameter D1 of the first supporting hole 76, and the second supporting hole 78 may also be formed communicated with the slide groove 74.

As a result, the shaft portion 80 (i.e., the movable plate 50) that has slid (moved parallel) from the switching position toward the center of the seat in the seat width direction (i.e., toward the direction in which arrow A in FIG. 6 is pointing) is able to be further rotated toward the center of the seat in the seat width direction (i.e., toward the direction in which arrow B in FIG. 6 is pointing), in the second supporting hole 78 of the slide groove 74. Therefore, the support pad 18A is able to be rotated even further toward the center of the seat in the seat width direction in the second supporting hole 78, so the support pad 18A is able to be adjusted further in the seat width direction for an occupant with a relatively small build.

Second Example Embodiment

Figure 7:
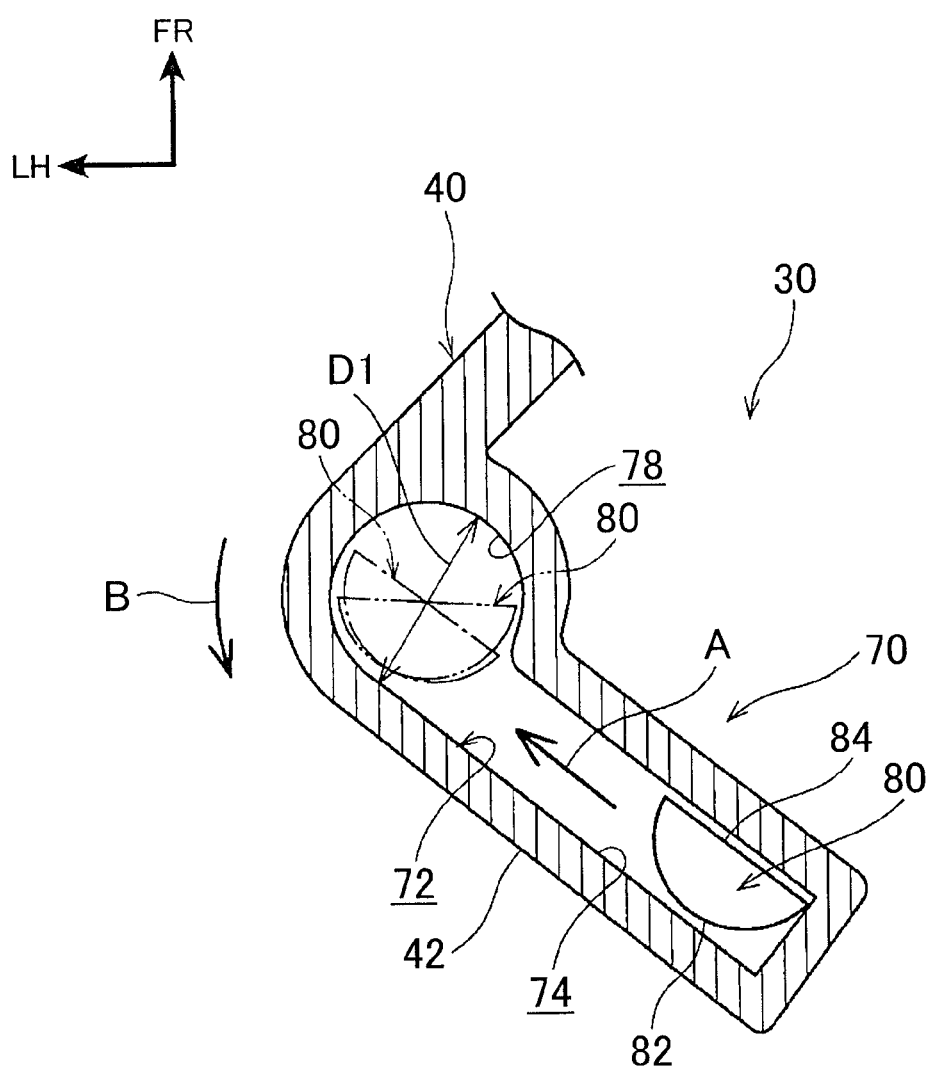
FIG. 7 is a top sectional view showing a frame format of a connecting mechanism of a side support adjuster according to a second example embodiment of the invention.

Hereinafter, a side support adjuster 30 according to a second example embodiment of the invention will be described with reference to FIG. 7. The side support adjuster 30 according to the second example embodiment has a structure similar to that of the side support adjuster 30 according to the first example embodiment, except for the connecting mechanism 70. Hereinafter, the connecting mechanism 70 used in the side support adjuster 30 according to the second example embodiment will be described.

That is, in the second example embodiment, the first supporting hole 76 of the groove 72 is omitted, and the second supporting hole 78 is formed on the other end portion in the length direction of the slide groove 74. This second supporting hole 78 is communicated with the slide groove 74, and the diameter of the second supporting hole 78 is set to be the same as the diameter D1 of the first supporting hole 76 in the first example embodiment. That is, the second supporting hole 78 is configured to be able to rotatably support the shaft portion 80.

Also, in the initial position, the shaft portion 80 is slidably inserted into one end portion in the length direction of the slide groove 74. That is, the flat portion 84 of the shaft portion 80 is arranged parallel to the slide groove 74. Also, the shaft portion 80 (i.e., the movable plate 50) slides along the slide groove 74 toward the center of the seat in the seat width direction such that its position in the second supporting hole 78 becomes the switching position. As a result, in the switching position, the shaft portion 80 (i.e., movable plate 50) is rotatably connected to the second supporting hole 78 (i.e., the fixed plate 40).

Then, when the seated occupant operates the operating button 66, the bladder 60 activates by control of the ECU 64, and the movable plate 50 is pushed toward the center of the seat in the seat width direction by the bladder 60. Accordingly, the movable plate 50 slides along the slide groove 74 from the initial position toward the center of the seat in the seat width direction (toward the direction in which arrow A in FIG. 7 is pointing) to the switching position. Consequently, the support pad 18A (i.e., the side support 14A) slides from the initial position to the switching position as the movable plate 50 slides. Then the movable plate 50 that has slid to the switching position is pushed toward the center of the seat in the seat width direction by the bladder 60, and the movable plate 50 is rotated from the switching position toward the center of the seat in the seat width direction (toward the direction in which arrow B in FIG. 7 is pointing). As a result, the support pad 18A (i.e., the side support 14A) rotates toward the center of the seat in the seat width direction as the movable plate 50 rotates.

In this way, with the side support adjuster 30 according to the second example embodiment, after the side support 14A (i.e., the support pad 18A) has slid toward the center of the seat in the seat width direction, the side support 14A (i.e., the support pad 18A) rotates toward the center of the seat in the seat width direction. Therefore, with the second example embodiment as well, the side support 14A (i.e., the support pad 18A) is able to be adjusted in the seat width direction according to the build of the seated occupant.

In the second example embodiment, the groove 72 is provided in the fixed plate 40, and the shaft portion 80 is provided on the movable plate 50. Instead of this, the shaft portion 80 may be provided on the fixed plate 40, and the groove 72 may be provided in the movable plate 50, similar to the modified example of the first example embodiment.

In the first and second example embodiments, the bag-like bladder 60 is used as a member that pushes the movable plate 50 toward the center of the seat in the seat width direction, but the member that pushes the movable plate 50 is not limited to this. For example, the movable plate 50 may be pushed toward the center of the seat by a piston or the like. In this case, a piston may be inserted into a cylinder, and the piston may be moved, thus pushing the movable plate 50 toward the center of the seat, by air being supplied into the cylinder.

Also, in the first and second example embodiments, the vehicle seat 10 to which the side support adjuster 30 is applied is a front seat, but the vehicle seat 10 may also be a rear seat mounted in a rear portion of a vehicle cabin.

The invention claimed is:

1. A side support adjuster comprising:
a fixed plate that is provided on a back surface side of a support pad that forms a side support on both sides of a seatback in a seat width direction, and that is fixed to a frame member of the seatback;
a movable plate that is provided between the fixed plate and the support pad, and supports the support pad from the back surface side, and that is relatively movably connected to the fixed plate such that the movable plate is not slidable with respect to the fixed plate at an initial position;
an actuator that is provided between the fixed plate and the movable plate, and that pushes the movable plate toward a seat width direction center side in response to being activated; and
a connecting mechanism that rotatably connects a seat width direction inside end portion of the movable plate to the fixed plate, in the initial position, and slidably connects the end portion to the fixed plate in a manner that enables the end portion to slide toward the seat width direction center side, in a switching position in which the movable plate has rotated a predetermined angle toward the seat width direction center side.

2. The side support adjuster according to claim 1, wherein
the connecting mechanism includes a shaft portion that is provided on one of the movable plate and the fixed plate, and of which an axial direction is in a seat height direction, and a groove provided in the other of the movable plate and the fixed plate;
an outer peripheral surface of the shaft portion includes an arced surface portion that is curved so as to have an arc-shaped cross-section, and a flat surface portion that connects both ends of the arced surface portion together; and
the groove has a slide groove that is formed in a straight line, a width of the slide groove being set larger than a diameter of a flat surface portion of the shaft portion and smaller than a diameter of the arced surface portion of the shaft portion, and a first supporting hole that is formed in one end portion of the slide groove in a length direction thereof, and into which the shaft portion in the initial position is rotatably inserted.

3. The side support adjuster according to claim 2, wherein
the groove has a second supporting hole configured to be able to rotatably support the shaft portion, at the other end portion of the slide groove in the length direction thereof.

4. A side support adjuster comprising:
a fixed plate that is provided on a back surface side of a support pad that forms a side support on both sides of a seatback in a seat width direction, and that is fixed to a frame member of the seatback;
a movable plate that is provided between the fixed plate and the support pad, and supports the support pad from the back surface side, and that is relatively movably connected to the fixed plate such that the movable plate is not rotatable with respect to the fixed plate at an initial position;
an actuator that is provided between the fixed plate and the movable plate, and that pushes the movable plate toward a seat width direction center side in response to being activated; and
a connecting mechanism that slidably connects a seat width direction inside end portion of the movable plate to the fixed plate in a manner that enables the end portion to slide toward the seat width direction center side, in the initial position, and rotatably connects the end portion to the fixed plate, in a switching position in which the movable plate has slid a predetermined distance toward the seat width direction center side.

5. The side support adjuster according to claim 4, wherein
the connecting mechanism includes a shaft portion that is provided on one of the movable plate and the fixed plate, and of which an axial direction is in a seat height direction, and a groove provided in the other of the movable plate and the fixed plate;
the groove has a slide groove that is formed in a straight line and into which the shaft portion in the initial position is slidably inserted, at one end in a length direction, and a supporting hole that is formed in an end portion of the slide groove in the length direction thereof, and that is configured to be able to rotatably support the shaft portion;
an outer peripheral surface of the shaft portion includes an arced surface portion that is curved so as to have an arc-shaped cross-section, and a flat surface portion that connects both ends of the arced surface portion together; and a width of the slide groove is set larger than a diameter of a flat surface portion of the shaft portion and smaller than a diameter of the arced surface portion of the shaft portion.

* * * * *